Nov. 1, 1966 H. C. SONDEREGGER 3,282,083
SPRING CHECKING APPLIANCE
Filed July 8, 1963 4 Sheets-Sheet 1
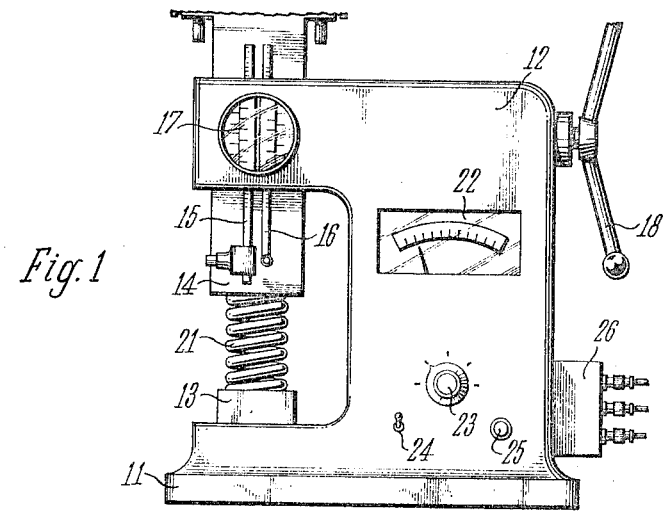
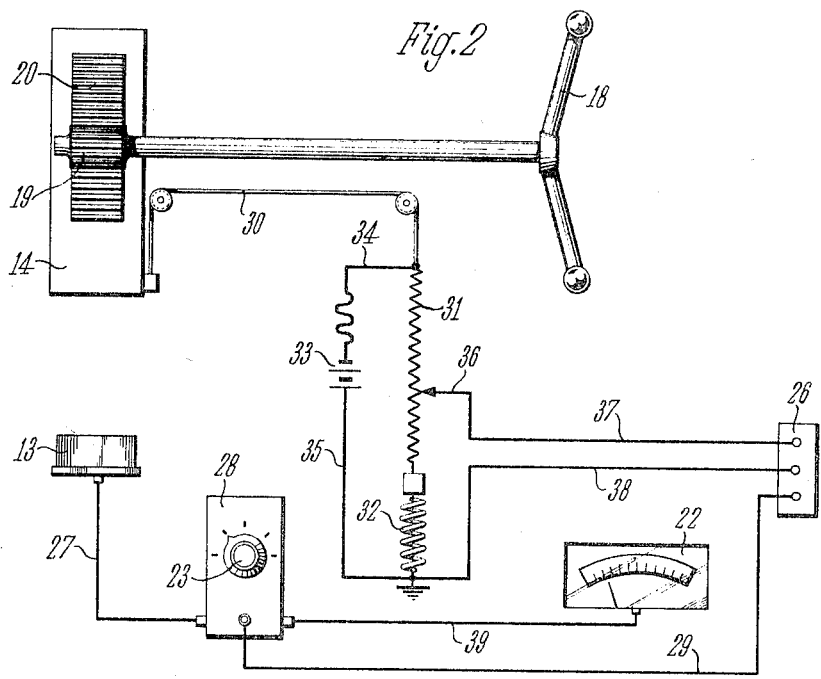
INVENTOR
HANS CONRAD SONDEREGGER
BY Dicke and Craig
ATTORNEYS

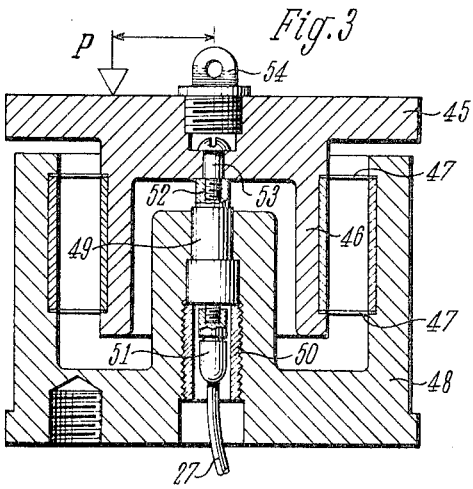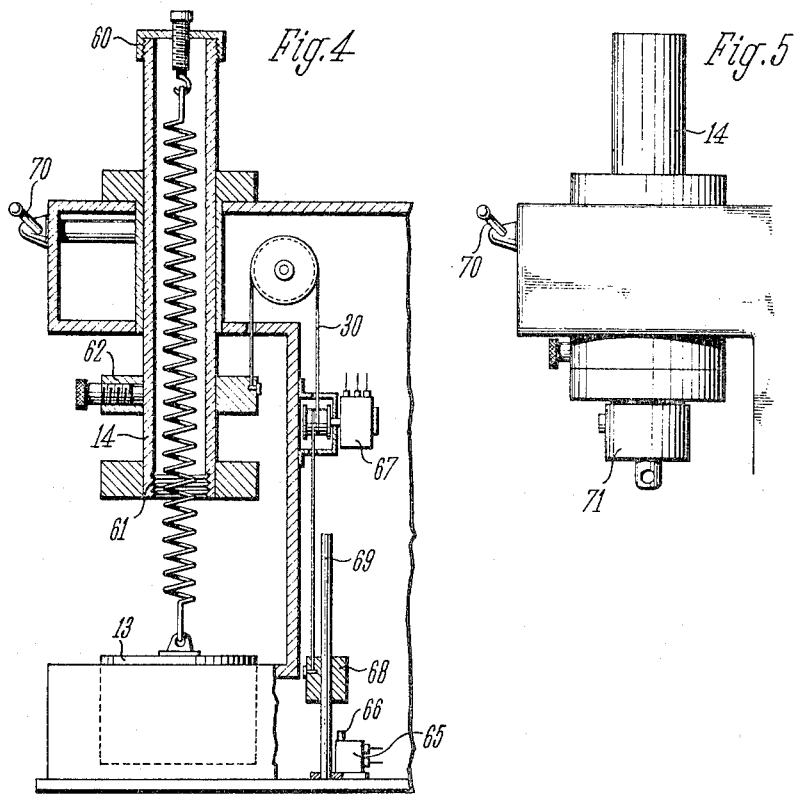

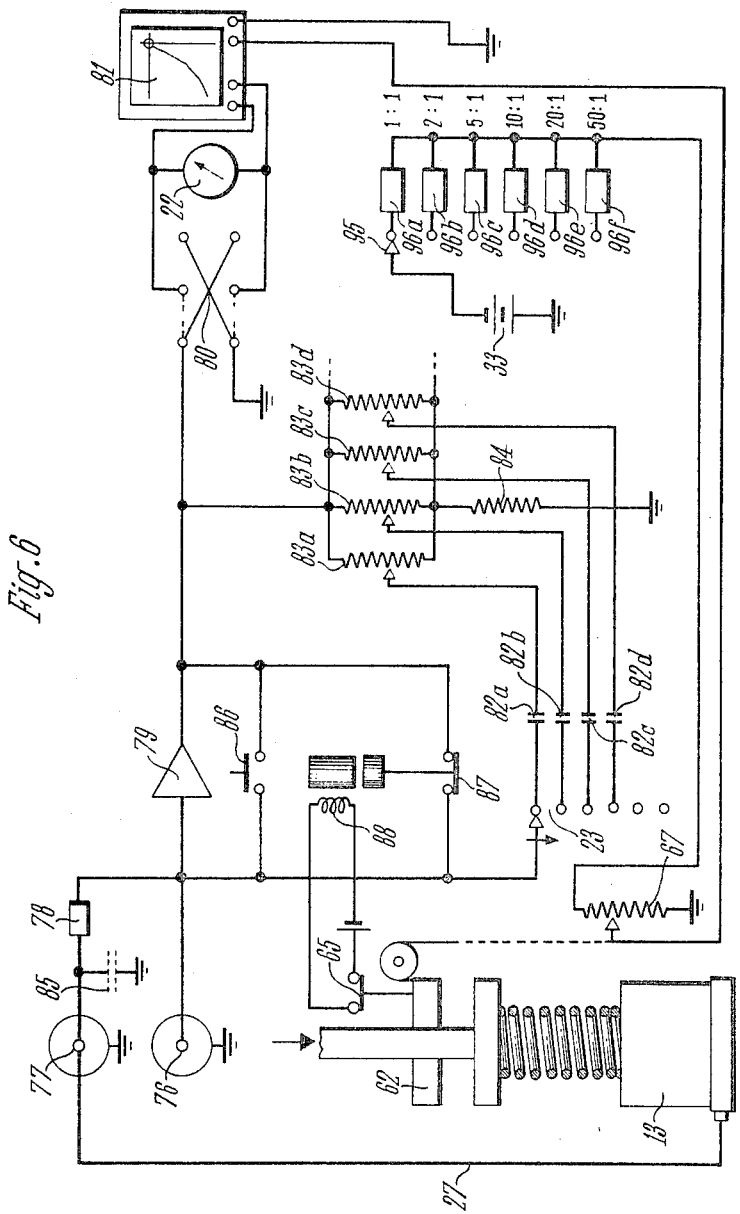

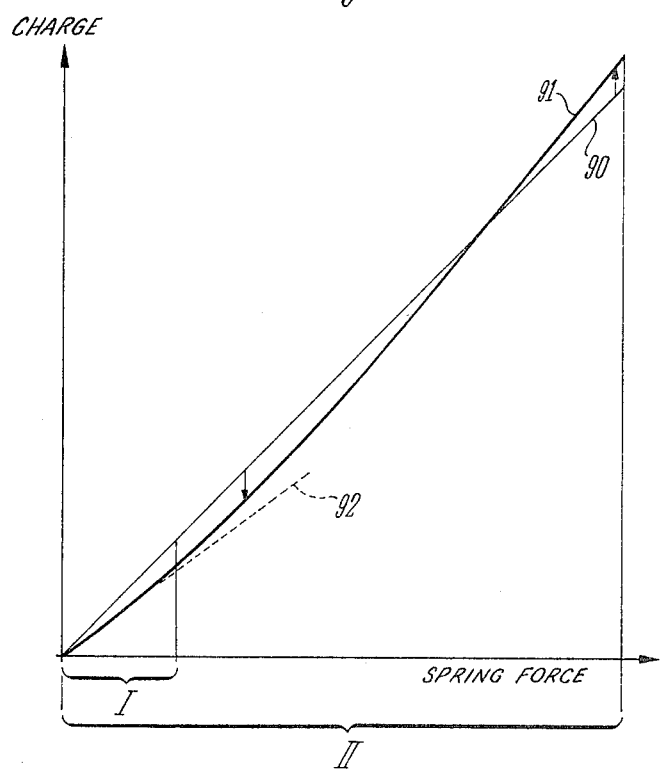

United States Patent Office 3,282,083
Patented Nov. 1, 1966

3,282,083
SPRING CHECKING APPLIANCE
Hans Conrad Sonderegger, Winterthur, Switzerland, assignor to Messers. Kistler Instrumente AG., Winterthur, Switzerland
Filed July 8, 1963, Ser. No. 293,927
27 Claims. (Cl. 73—161)

The invention relates to a spring checking appliance for determining the spring characteristics of tension and compression springs. Prior art devices generally comprise a force measuring device constructed in the form of a weight or spring balance and of a length measuring device which permits the total length and the yield of the spring to be measured either by mechanical or electrical means. Appliances of this kind have, however, the disadvantage that the force measurement produces or causes small displacements of the measuring support. This makes the length measurement of the spring yeld difficult since the force and the length measurement cannot be carried out simultaneously but one measurement follows the other in close steps. Thereby a rapid and exact determination of the spring data is made impossible.

It is an object of this invention to substantially eliminate the above noted disadvantages of the prior art devices.

It is a further object of this invention to provide a spring checking appliance that will permit a quicker, simpler, and more exact determination of the spring constants than is possible with the prior art devices.

Another and more specific object of this invention is to provide a spring checking appliance that permits the force and the length measurement to be carried out simultaneously, without influencing the accuracy of either measurement.

It is another object of this invention to provide a spring checking appliance that makes the force measurement with a piezo-electric measuring cell with elasticity properties corresponding approximately to those of a metallic workpiece and that simultaneously makes the force measurement with means that indicate the movement of the plunger used for exerting the force on the spring.

An appliance according to the invention permits a completely deformation-free measurement of the measurement forces exerted on the spring, owing to the piezo-electric measuring cell used for the force measurement. The length measurement can therefore be carried out simultaneously with the force measurement without any influence on the measurement accuracy and for each measurement force the respective length or length variation of the spring can be quickly and simply determined.

Conveniently, the measuring cell consists of a crystal unit of quartz, the elasticity properties of which correspond to those of metallic workpieces. The electric measuring signal of the piezo-electric measuring cell can further advantageously—in some cases after suitable amplification—be fed to an indicator instrument and/or to a recording device. Furthermore, means can be provided for converting the plunger movement into an electrical signal whereby the latter is fed to a common recording device for the force signal and for the movement signal, for simultaneous recording. For this purpose an embodiment is particularly desirable in which the recording device embodies means for indicating the force and the movement signals in a co-ordinate system. In a further advantageous embodiment of the invention, means can be provided for adjusting the amplification factor of the amplifier of the force signal to match the maximum sweep of the indicating instrument or of the recording device to the maximum measuring force to be exerted on the spring.

The invention and further associated features are explained further below on the basis of the constructional example shown in the drawing wherein:

FIG. 1 shows a spring checking appliance in a simplified view with hand operation of the force plunger, FIG. 2 is a diagrammatic view of the arrangement and circuit of the measuring elements used in the appliance of FIG. 1, FIG. 3 shows in section an embodiment of a tension and pressure measuring cell which can be used advantageously with the appliance of FIGURE 1, or other appliances, FIG. 4 shows a section through the parts of another embodiment of the invention, FIG. 5 shows a detail of the embodiment corresponding to FIG. 4, FIG. 6 is a circuit diagram of an embodiment of an amplifier used in accordance with the invention, and FIG. 7 shows the response of piezo-electric force determining device in one embodiment of the invention.

The checking appliance according to FIG. 1 comprises a piezo-electric force measuring cell 13 fixedly mounted on the foot 11 of the housing 12, a vertically displaceable force plunger 14 having a measuring rod 15 adjustably mounted on the plunger 14 and a measuring rod 16 rigidly mounted on the plunger 14, for accurate reading of the measuring rods a magnifying glass 17 is used.

The force plunger 14 is supported in the form of a slide in the housing 12 and can be moved up-and-down by means of the hand wheel 18. For this purpose the drive shown on FIG. 2 is used consisting of a pinion 19 and a rack 20. The spring sample 21 is inserted between the measuring cell 13 and the plunger 14 and the latter is moved downwardly until contact with the upper spring end is obtained. From the fixed measuring rod 16 the unstressed length of the spring can be read off, this corresponds to the spacing between the measuring cell 13 and the plunger 14. The adjustable measuring rod 15 is now brought to the zero position so that on displacement of the plunger the plunger movement or the length alteration of the spring can be read off directly.

The spring force acting on the force measuring cell 13 is indicated by the indicator instrument 22. In some cases an amplifier is interposed between the cell 13 and the instrument 22; the amplification factor thereof can be adjusted by means of an adjuster knob 23 for the purpose of adapting the maximum deflection of the indicator instrument to the maximum measuring force to be exerted on the spring, which permits the maximum possible measuring range to be utilized. The scale of the instrument 22 is conveniently marked directly in force units. The switch 24 serves for connecting the current supply for the electrical part of the appliance, while the adjusting knob 25 permits the normally necessary zero correction of the indicator instrument. The connector box 26 serves for connecting an electronic recording appliance, not shown, which indicates constantly and simultaneously the force and movement signals obtained, conveniently directly as a curve within a co-ordinate system.

As shown in FIG. 2 the measuring cell 13 is connected through the conductor 27 with the electronic amplifier 28 which is fitted in the housing 12. The amplified measurement signal is fed through the conductor 39 to the indicator instrument 22 and/or through the conductor 29 to one pole of the connector box 26 for a recording appliance. The movement of the force plunger 14 is transmitted to the cable or tape 30. The cable or tape 30, which is not electrically conductive, is fastened to a resistance measuring wire 31. A spring 32 ensures that the measuring wire 31 participates in every movement of the plunger 14, particularly in the opposite direction.

The two ends of the measuring wire 31 are connected to the voltage source 33 on the one hand by the flexible conductor 34 and on the other hand through the conductor 35 and the electrically conductive spring 32. With constant voltage across the ends of wire 31 the electrical contact 36 will obtain a measuring voltage proportional to the movement of the plunger 14; the voltage is fed through the conductor 37 to the connector box 26 for the recording appliance. The lower fixed end of the spring 32 is grounded to the frame and is also connected through the conductor 38 with the connector box 26.

The piezo-electric measuring cell 13 contains as the crystal unit one or more small quartz plates which have elasticity properties corresponding to metal workpieces. It will however also be possible to use other piezo-electric crystals the elasticity properties of which agree to the same order of magnitude with those of metallic workpieces, for example barium titanate. The measuring cell 13 thus measures the force exerted on the spring completely without deformation, according to the piezo-electric measuring principle. Due to this fact, only the movement of the force plunger 14 relatively to the housing 12 must be measured for determining the spring movement, which can be carried out in a very accurate and simple manner. Instead of the electrical movement measurement shown, a mechanical measurement of the movement can be used so far as the latter cannot be effected by simple reading of the measuring rods.

The operation of the force plunger can be effected by hand, or by hydraulic or pneumatic means. The measurement values can be read off by eye or can be retained by automatically printing or marking recording devices. The force measurement can be effected both by pressure or by tension; it is thus possible to measure both compression springs and tension springs.

A particularly advantageous embodiment of the invention permits the use of the appliance as a universal force-movement checking appliance which can be used in the textile and synthetic resin industries for tension testing and also for fatigue testing.

As shown in FIG. 3 the piezo-electric tension pressure measuring cell 13 is so constructed that the force receiving plate 45 embodies a cylindrical guide portion 46 equipped with two annular spring discs 47 fixedly clamped in an outer casing 48. A quartz piezo-electric measuring element 49 is inserted and held by a fastening bush 50. The force-responsive end 52 of the measuring element 49 is connected by means of a screw joint 53 with the force receiving plate 45. The two ring springs 47 provide a satisfactory parallel guide for the force receiving plate so that the element 49 receives only forces in the axial direction even where a force P is exerted off centre. The condition however is that the two ring discs 47 shall be installed in their neutral position and care must be taken in assembling the element 49 that no prestressing resulting from the ring springs acts thereon. In order to transmit tensional forces an eyelet or lug 54 can be fitted into the pressure receiving plate 45. The supply cable 27 is directly connected to the measuring element by means of a connector sleeve 51.

A modification of the invention is shown in FIG. 4 in which the compression and tension plunger 14 is in the form of a tube whereby long tensional test pieces can be suspended at the upper end by means of a flange 60. If necessary the lower flange end of the tube may be closed by a plug fitting into the screw-thread 61.

It has been found in practice that the cable 30 for measurement of the stroke should be operated not directly by the plunger but by means of an adjuster ring 62 adjustably fastened thereto. The other end of the cable is loaded by means of a weight 68 which is so chosen that the operating rod 66 of the switch 65 is operated when the adjuster ring 62 reaches the upper housing wall. By this switching operation the amplifier output is short circuited as will be described in relation to FIG. 6. Instead of using a resistor wire as in FIGURE 1, it is also possible to use a conventional rotating potentiometer 67, which may require one or more revolutions for full range operation. This potentiometer may be of the coated resistor type and may include a spiral multiple turn track. The weight 68 is guided along a guide bar 69.

The plunger 14 can be held in any desired position by means of a clamp lever 70. Thereby it is also possible to clamp the plunger 14 and mount a vibratory magnet 71 by threads 61 in the plunger whereby fatigue testing can be carried out, for example with a high frequency of about 100 c.p.s. The signal from the measuring cell 13 is not assessed by means of an X-Y register device but by means of an oscilloscope or recording chart on a force-time scale.

It is well recognized that the piezo-electric method is suitable particularly for dynamic operations. The measuring of static forces has suffered for many years from insufficient insulation of the source and from defects of electrometer amplifiers. With the constructional development of the sources on the one hand and the improvement in electrometer amplifiers as charge-measuring amplifiers on the other hand, the conditions have only just been obtained which permit a spring checking appliance to be carried out satisfactorily in the manner described.

FIGURE 6 shows a wiring diagram with a suitable amplifier. The circuit is arranged to conduct a small signal from the measuring cell 13 through conductor 27 to an input terminal 77, which leads to an electrometer through a high value resistor 78 in series with an amplifier 79. Alternatively, conventional switching means (not shown) may be used to deliver the small signal from the measuring cell 13 to terminal 76, which is connected directly to the electrometer amplifier 79. The amplified signal passes through a reverser switch 80, to be described hereinafter to an indicator instrument 22 or to a recorder 81. The essential feature of the charge measuring amplifier lies in the fact that the low resistance output of the amplifier 79 is fed back to the input of the amplifier 79 through a circuit comprising one of the resistors 83a, 83b, 83c, 83d, etc., in series with a corresponding one of the capacitors 82a, 82b, 82c, 82d, etc.; the particular circuit is selected by the adjustor knob 23. Resistors 83a, 83b, 83c, 83d, etc., form, with the resistor 84, a voltage dividing network, which permits only a part of the output voltage to be fed back through one of the capacitors 82.

The piezo-electric measuring cell 13, the cable 27 and stray capacities in the amplifier provide a certain input capacitance to the ground represented by the capacitor 85 shown in dotted lines. A small current produced in the cell 13 charges this capacitor 85 and there is produced a voltage to the input of the amplifier 79, which may be calculated on the basis of $$V = \frac{Q}{C}$$

this would be truly only if there were no feedback through the capacitors 82a, 82b, etc. However, a charge is fed back to the input through resistors 83a, 83b, 83c, etc., and capacitors 82a, 82b, 82c, etc.; these capacitors and resistors provide a low pass input filter.

If, for example, the amplifier 79 has a voltage amplification of 1000, the input load is compensated to .1%. The capacitors 82a, 82b, 82c, etc. must in practice have the same charge as is produced by the piezo-electric cell 13.

It may be assumed that the piezo-electric charge is applied directly to one of the capacitors 82a, 82b, 82c, etc. The input potential of the amplifier 79 is practically zero and the output voltage is so high that the said load Q is retained on one of the capacitors 82a, 82b, 82c, etc. The smaller the capacity of the bypass circuit, the greater must be the voltage at the output of the amplifier 79. The values of the capacitors 82a, 82b, 82c, etc., and the positions of the associated potentiometers 83a, 83b, 83c, etc., determine the amplication factor of the plant. By means of the switch 23 one or other of the feed back paths can be chosen and thus the required amplification can be selected.

It is known that with such feed back networks the amplification is determined in the first place by the feed back path. The amplification can be proportioned by means of this feed back so that the potentiometers 83a, 83b, 83c, etc., permit a fine adjustment. It is a known disadvantage of piezo-electric measurement that in general the insulation resistance is not sufficient to hinder the piezo-electric charges from discharging to the ground over an extended period. The time constant of this leakage is R×C. Wherein, R is the insulation resistance and C in the present case is the capacitor 85, when no feedback circuit is connected. The capacitance can be increased by additional parallel capacitors. If the capacitance is made large, the time constant RC would be large and the insulation faults would be less significant. However, with such a large capacitance, the voltage at the input of the amplifier 79 would be small, and therefore, the amplification would be small. If the value of resistor 78 is made as small as possible, senstivity would be great, but the time constant would be too small.

However, with the present invention including the feed back, the time constant is again R×C, wherein R is the insulation resistance; however, C is no longer the capacitor 85 but has the value of the selected one of the capacitors 82a, 82b, etc., multiplied by the amplification factor of the amplifier 79, which in general is very great. The time constant RC is then so great that the insulation losses no longer have any effect in practice. The zero point constancy for static measurement is no longer dependent on the insulation but on the grid current of the electrometer stage of the amplifier 79. The capacity feed back largely overcomes the insulation problem, but it also has other advantages normally obtained with feed back circuits such as high stability, low noise, little spurious oscillation, low zero point drift and so on. Thus, it is seen that the present invention provides a high value for the RC time constant to reduce or substantially eliminate the piezo-electric leakage, while at the same time providing a substantial voltage for the input of the amplifier 79.

The charges that collect slowly on the capacitors 82a, 82b, 82c, etc., and 85 as a result of the grid current and affects the zero point drift can be eliminated by operating the push buttons 86 and 87. Push button 86 is on the front plate of the amplifier and is operated by hand. The push button 87 is a remotely operated switch, which is operated by a magnet coil 88. Before measuring, the switches 87 and 65 are normally closed. When the adjuster ring 62 moves away from its zero position, the switches 65 and 87 open and the measurement amplifier is ready for measurement. As soon as the adjuster ring 62 returns to its starting position after one loading operation, the switches 65 and 87 are again closed and the original zero point is again accurately obtained.

The appliance may be used for compression and for tension measurements. Positive or negative voltages may be obtained at the output of the amplifier 79, and the reverser switch 80 is provided so that the measuring instrument 22 or the recorder 81 always move in the same direction.

When manipulating the spring, it may strike the piezoelectric pressure measuring cell 13. This produces vibrations of high frequency and amplitude, which, at higher sensitivities or with a small feed back coupling capacitor, can result in overloading the amplifier in such a manner that positive voltages appear at the grid of the electrometer tube to produce a relatively strong grid current. In order to avoid such an event, a high value resistor 78 is provided to dampen such high frequency voltages. Thereby, the frequency response of the receiving apparatus is severely affected. If measurements are to be carried out in which a given frequency response must be maintained, the alternate input 76 is used to lead directly to the electrometer amplifier 79.

In practice, the appliance of the present invention has an accuracy which is very high and extends towards the limits of what can be obtained by the piezo-electric measuring method. The response of the piezo-electric cell 13 may be illustrated with the diagram of FIGURE 7, wherein the charge produced by the cell 13 is plotted on the vertical axis and the force exerted on the spring is plotted on the horizontal axis. The response curve of a piezo-electric force measuring device is generally not an ideal straight line 90, as in FIG. 7, but exhibits a somewhat curved response as indicated at 91. In practice, such a response curve would not be employed in such an appliance. The true response curve 91 is replaced by an ideal curve 90, which is obtained through computation from the true response curve 91 or by suitably calibrating a recording instrument. Deviation between the true curve 91 and the ideal curve 90 may have to be taken into account as a fault but in general it does not exceed 1%.

A principal advantage of the present invention is that the piezo-electric measuring cell may selectively operate in a plurality of different ranges of force, selected by the adjuster knob 23. If a responder device does not have the ideal reference curve 90 of FIG. 7, the average sensitivity does not lie in various ranges thereof.

FIG. 7 shows an example in which the curve 91 can be represented by a straight line 90 in the range II by means of a definite reference factor so that only small faults are produced. In range I, which is about five times smaller, the same reference curve 91 is better replaced by the straight line 92 in place of the straight line 90. The straight line 92 corresponds however to a somewhat different reference factor than the straight line 90. In order to permit these fine adjustments, the potentiometers 83a, 83b, 83c, etc., are provided which can be adjusted on the finished instrument. Each measuring range can then be calibrated separately with standard weights and the sensitivity adjusted accurately by means of the potentiometers 83a, 83b, 83c, etc., in order to obtain the closest possible approximation to the straight line response.

If conventional coordinate recording or indicating devices are used to measure the spring deflection, the range of the deflection signal may be accurately adjusted with the present invention. FIG. 6 shows how this can be conveniently performed by electrical means. A current source 33 of stable voltage feeds the potentiometer 67 through a selector switch 95 and a selected one of the resistors 96a, 96b, 96c, etc. At the potentiometer 67, a voltage is taken from the moveable member, which is a measure of the movement of the plunger 14. This voltage is fed to the XY recorder or indicator 81. The resistors 96a, 96b, 96c, etc., can be chosen in such a manner that there is obtained a multiplication of the movement of the plunger 14 in the ratios 1:1, 2:1, 5:1, 10:1, 20:1 or 50:1. The desired multiplication ratios can be selected directly by the switch 95. Most commercial coordinate recorders or indicators comprise in the input circuit a voltage divider which permits various sensitivities in the recorder or indicator to be selected. Most of them also comprise means for cutting out the voltage divider whereby only that of highest sensitivity is used but the input to the recorder or to the recorder amplifier is of the high resistance type. The recorder or indicator however only operates satisfactorily if this high resistance input is fed from a relatively low resistance source since it has been found by experience that high resistance circuits in a measuring system are very liable to provide stray voltages of all kinds. With the arrangement described, the input to the recorder is taken from the potentiometers 67 which may be of comparatively low resistance. On the other hand, by using the high resistance input of the amplifier for the coordinate recorder or indicator, linearity faults are avoided by the circuit loading resulting from the potentiometer 67.

What I claim is:

1. A test apparatus, comprising:
plunger means to exert a force on a resilient deformable test item;
a substantially non-compressible support means to support the test item and oppose the force exerted by said plunger means;
said plunger means and said support means being arranged so that the movement of said plunger means is a direct indication of the deformation of the test item;
first scale means rigidly mounted on said plunger means to indicate the space between said plunger means and said support means, to determine a dimension of the test item;
second scale means, including a portion mounted on said plunger means, to determine the movement of said plunger means;
means to adjustably mount said second scale means on the apparatus to adjust said scale means to indicate a zero movement of the plunger means when said plunger means is in contact with the test item before any force is exerted; and
said second scale means indicating the displacement of said plunger and the deformation of said test item.

2. A test apparatus, comprising:
plunger means to exert a force on a resilient deformable test item;
a substantially non-compressible support means to support the test item and oppose the force exerted by said plunger means;
force indicator means to indicate the force exerted on the test item by said plunger means, including piezoelectric means,
amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means.

3. A test apparatus, comprising:
plunger means to exert a force on a resilient deformable test item;
a substantially non-compressible support means to support the test item and oppose the force exerted by said plunger means;
force indicator means to indicate the force exerted on the test item by said plunger means, including piezoelectric means,
amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means,
said plunger means and said support means being operable so that the movement of said plunger means is a direct indication of the deformation of the test item;
displacement indicator means to indicate the displacement of said plunger means to function simultaneously with said force indicator means.

4. A test apparatus, comprising:
plunger means to exert a force on a resilient deformable test item;
a substantially non-compressible support means to support the test item and oppose the force exerted by said plunger means;
force indicator means to indicate the force exerted on the test item by said plunger means, including piezoelectric means,
amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means,
a plurality of said feedback circuit means arranged in parallel with each other and having different values of resistance and capacitance;
means to selectively connect one of said feedback circuit means in the amplifier circuit to selectively change the amplification of said amplifier.

5. A test apparatus, comprising:
plunger means to exert a force on a resilient deformable test item;
a substantially non-compressible support means to support the test item and oppose the force exerted by said plunger means;
force indicator means to indicate the force exerted on the test item by said plunger means, including piezoelectric means;
amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means,
a plurality of said feedback circuit means arranged in parallel with each other and having different values of resistance and capacitance,
means to selectively connect one of said feedback circuit means in the amplifier circuit to selectively change the amplification of said amplifier;
a displacement indicator means operable to produce an electrical signal proportional to the displacement of said plunger means;
means to selectively change the power of said signal of said displacement indicator means.

6. A test apparatus, comprising:
plunger means to exert a force on a resilient deformable test item;
a substantially non-compressible support means to support the test item and oppose the force exerted by said plunger means;
force indicator means to indicate the force exerted on the test item by said plunger means, including piezoelectric means,
amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means,
said plunger means and said support means being operable so that the movement of said plunger means is a direct indication of the deformation of the test item,
displacement indicator means to indicate the displacement of said plunger means to function simultaneously with said force indicator means,
coordinate recorder means to simultaneously record the force produced by said plunger means and the displacement of said plunger means.

7. A test apparatus, comprising:
plunger means to exert a force on a resilient deformable test item;
a substantially non-compressible support means to support the test item and oppose the force exerted by said plunger means;

force indicator means to indicate the force exerted on the test item by said plunger means, including piezo-electric means;

amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, said plunger means and said support means being operable so that the movement of said plunger means is a direct indication of the deformation of the test item, displacement indicator means to indicate the displacement of said plunger means to function simultaneously with said force indicator means, coordinate recorder means to simultaneously record the force produced by said plunger means and the displacement of said plunger means, means to selectively short-circuit said amplifier means to produce a zero indication of the force on said recorder means.

8. A test apparatus, comprising;

plunger means to exert a force on a resilient deformable test item;

a substantially non-compressible support means to support the test item and oppose the force exerted by said plunger means;

force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, said plunger means and said support means being operable so that the movement of said plunger means is a direct indication of the deformation of the test item, displacement indicator means to indicate the displacement of said plunger means to function simultaneously with said force indicator means, coordinate recorder means to simultaneously record the force produced by said plunger means and the displacement of said plunger means, means to short-circuit said amplifier to produce a zero force reading on said recorder when said plunger means is furtherest removed from said support means.

9. A test apparatus, comprising;

plunger means to exert a force on a resilient deformable test item;

a substantially non-compressible support means to support the test item and oppose the force exerted by said plunger means;

force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance;

means to selectively connect one of said feedback circuit means in the amplifier circuit to selectively change the amplification of said amplifier, each of said feedback circuit means including a fixed capacitor and a variable resistor in series.

10. A test apparatus, comprising;

plunger means to exert a force on a resilient deformable test item;

a substantially non-compressible support means to support the test item and oppose the force exerted by said plunger means;

force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means;

a plurality of said feedback circuit means arranged in parallel with each other and having different values of resistance and capacitance, means to selectively connect one of said feedback circuit means in the amplifier circuit to selectively change the amplification of said amplifier;

a displacement indicator means operable to produce an electrical signal proportional to the displacement of said plunger means, means to selectively change the power of said signal of said displacement indicator means, coordinate recorder means to simultaneously record the force and displacement of said plunger means in response to the output of said amplifier means and the signal of said force indicator means.

11. A test apparatus, comprising;

plunger means to exert a force on a resilient deformable test item;

a substantially non-compressible support means to support the test item and oppose the force exerted by said plunger means;

said plunger means and said support means being operable so that the movement of said plunger means is a direct indication of the deformation of the test item;

displacement indicator means to indicate the displacement of said plunger, and force indicator means to indicate the force exerted on the test item by the plunger means, including piezo-electric means, said piezo-electric means being substantially non-compressible.

12. A test apparatus, comprising;

plunger means to exert a force on a resilient deformable test item;

a substantially non-compressible support means to support the test item and oppose the force exerted by said plunger means;

said plunger means and said support means being operable so that the movement of said plunger means is a direct indication of the deformation of the test item;

displacement indicator means to indicate the displacement of said plunger; and said force indicator means to indicate the force exerted on the test item by the plunger means, including piezo-electric means, said plunger means including relatively long tubular means to support relatively long tensioned test items therein and to form a force connection with the test item at the end of the tube remote from said support means.

13. A test apparatus, comprising;

plunger means to exert a force on a resilient deformable test item;

a substantially non-compressible support means to support the test items and oppose the force exerted by said plunger means;

said plunger means and said support means being operable so that the movement of said plunger means is a direct indication of the deformation of the test item;

displacement indicator means to indicate the displacement of said plunger; and force indicator means to indicate the force exerted on the test item by the plunger means, including piezo-electric means, said plunger means including vibrator magnet means mounted on the force exerting end of said plunger means.

14. A test apparatus, comprising;

plunger means to exert a force on a resilient deformable test item, a substantially non-compressible support means to support the test items and oppose the force exerted by said plunger means;

force indicator means to indicate the force exerted on the test item by said plunger means, including piezo-electric means.

amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, said amplifier means having a low resistance output and a high resistance input.

15. A test apparatus, comprising;

plunger means to exert a force on a resilient deformable test item;

a substantially non-compressible support means to support the test item and oppose the force exerted by said plunger means;

force indicator means to indicate the force exerted on the test item by said plunger means, including piezo-electric means;

amplifier means to amplify the output of said piezo-electric means including feedback circuit means to substantially increase the RC time constant that determines the leakage of said piezo-electric means to substantially eliminate the leakage without substantially effecting the magnitude of the piezo-electric signal input to said amplifier means, means to selectively reverse the voltage output of said amplifier.

16. A test apparatus, comprising;

plunger means to exert a force on a resilient deformable test item;

a substantially non-compressible support means to support the test item and oppose the force exerted by said plunger means, force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a low pass filter in circuit between said piezo-electric means and the input of said amplifier.

17. A test apparatus, comprising;

plunger means to exert a force on a resilient deformable test item;

a substantially non-compressible support means to support the test item and oppose the force exerted by said plunger means, force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a low pass filter in the circuit between said piezo-electric means and the input of said amplifier comprising a high value resistor and the connecting cables between said piezo-electric means and said amplifier, which produce a stay capacitance.

18. A test apparatus, comprising;

plunger means to exert a force on a resilient deformable test item;

a substantially non-compressible support means to support the test item and oppose the force exerted by said plunger means;

force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, said plunger means and said support means being operable so that the movement of said plunger means is a direct indication of the deformation of the test item, a low pass filter in circuit between said piezo-electric means and said amplifier.

19. A test apparatus, according to claim 4, including;

a low pass filter in circuit between said piezo-electric means and said amplifier.

20. A test apparatus, comprising:

plunger means to exert a force on a resilient deformable test item;

a substantially non-compressible support means to support the test item and oppose the force exerted by said plunger means;

force indicator means to indicate the force exerted on the test item by said plunger means, including a piezo-electric means;

amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance, means to selectively connect one of said feedback circuit means in the amplifier circuit to selectively change the amplification of said amplifier, a displacement indicator means operable to produce an electrical signal proportional to the displacement of said plunger means, means to selectively change the power of said signal of said displacement indicator means, a low pass filter in circuit between said piezo-electric means and said amplifier.

21. A test apparatus, comprising;

plunger means to exert a force on a resilient deformable test item, a substantially non-compressible support means to support the test item and oppose the force exerted by said plunger means, force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance, means to selectively connect one of said feedback circuit means in the amplifier circuit to selectively change the amplification of said amplifier, a coordinate recording means to simultaneously record the force as indicated by said force indicator means and the displacement as indicated by said displacement indicator means.

22. A test apparatus, comprising;

plunger means to exert a force on a resilient deformable test item, a substantially non-compressible support means to support the test item and oppose the force exerted by said plunger means, force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance, means to selectively connect one of said feedback circuit means in the amplifier circuit to selectively change the amplification of said amplifier, a coordinate recording means to simultaneously record the force as indicated by said force indicator means and the displacement as indicated by said displacement indicator means, means to short circuit said amplifier means to produce a zero reading of force on said recorder means.

23. A test apparatus, comprising;

plunger means to exert a force on a resilient deformable test item, a substantially non-compressible support means to support the test item and oppose the force exerted by said plunger means, force indicator means to indicate the force exerted on the test item by said plunger means, including piezo-electric means;

amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal to said amplifier means, said plunger means and said support means being operable so that the movement of said plunger means is a direct indication of the deformation of the test item, a low pass filter in circuit between said piezo-electric means and said amplifier, coordinate recorder means to simultaneously record the force as indicated by said force indicator means and the displacement as indicated by said displacement indicator means.

24. A test apparatus, comprising;

plunger means to exert a force on a resilient deformable test item, a substantially non-compressible support means to support the test item and oppose the force exerted by said plunger means;

force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a low pass filter in circuit between said piezo-electric means and said amplifier, coordinate recorder means to simultaneously record the force as indicated by said force indicator means and the displacement as indicated by said displacement indicator means.

25. A test apparatus, comprising;

plunger means to exert a force on a resilient deformable test item;

a substantially non-compressible support means to support the test item and oppose the force exerted by said plunger means, force indicator means to indicate the force exerted on the test item by said plunger means, including a piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance, means to selectively connect one of said feedback circuit means in the amplifier circuit to selectively change the amplification of said amplifier, a displacement indicator means operable to produce an electrical signal proportional to the displacement of said plunger means, means to selectively change the power of said signal of said displacement indicator means, a low pass filter in circuit between said piezo-electric means and said amplifier, coordinate recorder means to simultaneously record the displacement as indicated by said displacement means and the force as indicated by said force indicator means.

26. A test apparatus, comprising;

plunger means to exert a force on a resilient deformable test item, a substantially non-compressible support means to support the test item and oppose the force exerted by said plunger means, force indicator means to indicate the force exerted on the test item by said plunger means, including piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a low pass filter in circuit between said piezo-electric means and said amplifier, coordinate recorder means to simultaneously record the force as indicated by said force indicator means and the displacement as indicated by said displacement indicator means, means to selectively short out said amplifier to produce a zero reading of force on said recorder means.

27. A test apparatus, comprising;

plunger means to exert a force on a resilient deformable test item;

a substantially non-compressible support means to support the test item and oppose the force exerted by said plunger means, force indicator means to indicate the force exerted on the test item by said plunger means, including a piezo-electric means, amplifier means to amplify the output of said piezo-electric means, including feedback circuit means to substantially increase the RC time constant that determines the leakage of said piezo-electric means to substantially eliminate the leakage without substantially effecting the magnitude of the piezo-electric signal input to said amplifier means, a plurality of said feedback circuit means arranged in parallel with each other and having different values of resistance and capacitance, means to selectively connect one of said feedback circuit means in the amplifier circuit to selectively change the amplification of said amplifier, a displacement indicator means operable to produce an electrical signal proportional to the displacement of said plunger means, means to selectively change the power of said signal of said displacement indicator means, a low pass filter in circuit between said piezo-electric means and said amplifier, coordinate recorder means to simultaneously record the displacement as indicated by said displacement means and the force as indicated by said force indicator means, means to selectively short out said amplifier to produce a zero reading of force on said recorder means.

References Cited by the Examiner
UNITED STATES PATENTS

| | | | |
|---|---|---|---|
| 2,568,596 | 9/1951 | Ruge | 73—161 |
| 3,086,132 | 4/1963 | Ostrow. | |
| 3,165,926 | 1/1965 | Orr et al. | 73—161 |

OTHER REFERENCES

Norton: "Piezoelectric Pressure Transducers," Instruments and Control System, February 1963, pp. 83-85.

DAVID SCHONBERG, *Primary Examiner.*